United States Patent [19]

Desjardins et al.

[11] Patent Number: 5,700,512
[45] Date of Patent: Dec. 23, 1997

[54] PREPARATION OF FOOD EXTRUDATE WHICH FLOATS DURING REHYDRATION

[75] Inventors: Jean-Jacques Desjardins, Denges; Pierre Dupart, Preverenges, both of Switzerland

[73] Assignee: Nestec S.A., Vevey, Switzerland

[21] Appl. No.: 403,736

[22] PCT Filed: Jul. 26, 1994

[86] PCT No.: PCT/CH94/00155

§ 371 Date: May 15, 1995

§ 102(e) Date: May 15, 1995

[87] PCT Pub. No.: WO95/04475

PCT Pub. Date: Feb. 16, 1995

[30] Foreign Application Priority Data

Aug. 11, 1993 [CH] Switzerland ............... 2384/93

[51] Int. Cl.$^6$ .................................................. A23L 1/16
[52] U.S. Cl. .................. 426/557; 426/443; 426/448; 426/449; 426/450; 426/451; 426/516
[58] Field of Search .................................. 426/549, 557, 426/516, 443, 446, 448, 449, 450, 451

[56] References Cited

U.S. PATENT DOCUMENTS

| | | | |
|---|---|---|---|
| 3,846,563 | 11/1974 | Cunningham | 426/158 |
| 4,158,069 | 6/1979 | Cox | 426/557 |
| 4,218,480 | 8/1980 | Dvson et al. | 426/19 |
| 4,243,690 | 1/1981 | Murakami et al. | 426/557 |
| 4,364,961 | 12/1982 | Darley et al. | 426/4 |
| 4,394,397 | 7/1983 | Lometillo et al. | 426/557 |
| 4,440,793 | 4/1984 | Seki | 426/549 |
| 4,495,214 | 1/1985 | Seltmer et al. | 426/557 |
| 4,568,550 | 2/1986 | Fulger et al. | 426/19 |
| 4,609,557 | 9/1986 | Mao et al. | 426/549 |
| 4,609,558 | 9/1986 | Giacone et al. | 426/549 |
| 4,943,438 | 7/1990 | Rosenthal | 426/92 |

FOREIGN PATENT DOCUMENTS

| | | |
|---|---|---|
| 966891 | 8/1964 | United Kingdom . |
| 2136666 | 9/1984 | United Kingdom . |
| 2176089 | 12/1986 | United Kingdom . |

*Primary Examiner*—Lien Tran
*Attorney, Agent, or Firm*—Vogt & O'Donnell, LLP

[57] ABSTRACT

A dried food composition is prepared by extrusion-cooking and drying so that the composition has a specific gravity of from 150 g/l to 500 g/l, and when rehydrated during preparation of such as a soup, the composition floats during rehydration. To prepare the composition, cereal flour and/or semolina, a fat, water and a protein and/or glucide filler substance ingredients are introduced into a twin-screw extruder and extrusion-cooked, the extruded, cooked product is cut into pieces and then, the product pieces are dried, and the ingredients are in amounts and are extrusion-cooked under a temperature of from 80° C. to 160° C. under a pressure of from 60 bar to 150 bar so that upon extrusion-cooking, the extruded, cooked product has, by weight, a fat content of from 6% to 14% and a moisture content of from about 10% to 16% and so that upon the extrusion cooking and drying, the dried product has a specific gravity of from 15 g/l to 500 g/l.

15 Claims, No Drawings

PREPARATION OF FOOD EXTRUDATE WHICH FLOATS DURING REHYDRATION

BACKGROUND OF THE INVENTION

This invention relates to a new food product and to a process for its production. More particularly, the invention relates to a rapidly rehydratable product intended for addition to instant soups.

The production of pastas capable of rehydrating rapidly a few minutes after addition to hot water is known. However, the pastas in question have a thickness of only 0.8 to 1.2 mm to facilitate their rehydration. It is known that, if the pastas mentioned have a greater thickness of the order of 1.5 mm or more, complete rehydration is not possible, i.e., part of the pasta remains hard and non-rehydrated. In addition, when hot water is added to them, the pastas in question remain on the bottom of the bowl or plate.

SUMMARY OF THE INVENTION

Applicants addressed the problem of producing a food product suitable for addition to an instant soup and capable of floating on top while keeping its shape for a few minutes, the product having a thickness of up to 5 mm and retaining its instant character on rehydration.

In a first embodiment, therefore, the invention relates to a rapidly rehydratable food product with a thickness of 1.5 to 5.0 mm and a specific gravity of 150 to 500 g/l which is capable of floating on the surface of a liquid and which comprises ground cereals, a fat and a filler selected from the group consisting of proteins and glucides.

In a second embodiment, the invention relates to a process for the production of this food product, in which a mixture comprising ground cereals, a fat and a filler selected from the group consisting of proteins and glucides is prepared and then shaped and cooked in a twin-screw extruder/cooker at a temperature of 80° to 160° C. and under a pressure of 60 to 150 bar to obtain a product having the required shape, a thickness of 1.5 to 5.0 mm and a specific gravity of 150 to 500 g/l.

Applicants have surprisingly found that the food product thus prepared is readily rehydratable despite its considerable thickness and, in addition, has the particularly remarkable characteristic of floating on the surface of a liquid in a lasting manner.

One advantage of the present invention is that it provides a rapid process for the production of the food product which divides up into an extrusion-cooking step of the order of 1 minute in duration and a simple drying step of the order of 3 to 15 minutes in duration, depending on the process used and the end product required. Another advantage of the invention is that it reduces the risk of the product breaking, particularly during the drying step, which is generally associated with the thinness of the product.

DETAILED DESCRIPTION OF THE INVENTION

In the present description, percentages and parts are by weight.

To carry out the process according to the invention, a mixture comprising ground cereals, a fat and a filler selected from the group consisting of proteins and glucides is prepared. Any type of ground cereals, for example a flour or semolina of wheat, corn or barley for example, may be selected. The fat is preferably a source of stable saturated fatty acids, such as hydrogenated palm oil. The fat is selected to avoid souring of the product before or after its production. The filler is selected from the group consisting of proteins and glucides. The function performed by the filler is inter alia to enable the viscosity of the pasta in the extruder to be reduced so that it can be cut, to regulate the apparent density of the product obtained and, optionally, to provide it with certain organoleptic qualities, such as colour and/or crispiness. The filler may comprise animal or vegetable proteins and/or glucides and may be substances, for example, such as skimmed milk powder, bran, oatmeal or soya flour, sucrose or glucose.

In one preferred embodiment, a dry mixture comprising 35 to 50 parts of ground cereals and 5 to 15 parts of filler is prepared. The filler preferably comprises 2.5 to 5.5 parts of oatmeal, 0 to 7.0 parts of sucrose or glucose and 0.5 to 3.0 parts of skimmed milk powder.

The dry mixture thus prepared and water and a fat are introduced into a twin-screw extruder/cooker. Approximately 5 to 15 parts of an emulsified mixture of water and fat to 50 parts of the dry mixture may be introduced to obtain a moisture content at the extruder exit of around 10 to 16% and a total fat content of 6 to 14%. The extrusion cooking step is carried out at 80° to 160° C. under a pressure of 60 to 150 bar, generally over a period of 30 to 90 seconds. A standard rotational speed of the screws of the order of 200 to 400 revolutions per minute is generally used. The cooked mixture is then cut into pieces in the usual way on leaving the extruder. In general, it has a moisture content of the order of 10 to 16%.

This product may then be dried by any known means, for example by means of a fluidized bed, at a temperature of 80° to 130° C. to obtain a product having a moisture content of 1 to 3%.

The present invention enables a crispy product to be obtained with a thickness of up to 5 mm and a specific gravity of 150 to 500 g/l.

This product may be used, for example, in a dehydrated soup which may be reconstituted by addition of hot water and then leaving for 4 to 6 minutes or even by addition of cold water and placing in a microwave oven. The product floats on the surface of the liquid and retains its original shape after at least 5 minutes in the liquid. In addition, the product does not disintegrate on contact with water or with a spoon and does not assume a sticky texture in the mouth, but retains a suitable firm texture.

The product may also be added to a salad where it may replace the croutons traditionally added. In this case, the product may be flavoured as required during its production. This use is made possible by the fact that the product according to the invention has a firm, crispy texture after its production and may therefore be eaten as such.

EXAMPLES

The invention is illustrated in more detail by the following Examples.

Example 1

A mixture comprising 38 kg of ground cereals consisting of a mixture of corn semolina and wheat flour, 9 kg of a mixture of 1.5 kg of skimmed milk powder, 3.7 kg of sucrose and 4 kg of oatmeal and 1 kg of sodium chloride is prepared. The mixture thus prepared is introduced into a twin-screw extruder/cooker together with 4 kg of hydrogenated palm oil (i.e., around 8%) and 6 liters of water. Extrusion-cooking is carried out at a temperature of 110° to 120° C., under a pressure of 100 to 105 bar and at a rotational speed of the screws of 250 revolutions per minute.

The extrusion-cooking step lasts about 30 to 50 seconds. The extruded/cooked mixture leaves the extruder through an extrusion die with the required shape and is cut just after leaving the extrusion die. The product obtained has a moisture content of 12 to 14% and is dried in a fluidized bed for about 15 minutes at 100° C. to obtain an end product having a moisture content of 3%. The end product thus obtained is crispy and has a thickness of 3 mm at its centre, which corresponds to the thickest point, and a specific gravity of 260 g/l.

Example 2

A product according to the invention is prepared in the same way as the preceding Example except that the extrusion conditions (temperature or pressure) and the fat content and water content of the mixture before extrusion are varied.

The following results are obtained:

a) Variation of the extrusion temperature (or pressure) for otherwise the same conditions as in Example 1.

70° C., 110 bar (or 60 bar, 100° C.): part of the product no longer floats on the surface of the liquid and "sinks" to the bottom of the bowl.

100° C., 110 bar: crispy product which floats and has a firm texture in the mouth after soaking for 5 minutes.

170° C., 110 bar (or 160 bar, 100° C.): the end product loses its shape and disintegrates when soaked in a liquid for 5 minutes.

b) Variation of the quantity of fat added to the dry mixture for otherwise the same conditions as in Example 1.

Less than 5%: the end product is very swollen; it loses its shape and disintegrates when soaked in a liquid for 5 minutes.

8%: crispy product which floats and has a firm texture in the mouth after soaking.

More than 15%: dense product; part of the product no longer floats on the surface of the liquid and "sinks" to the bottom of the bowl.

c) Variation of the quantity of water added to the mixture for otherwise the same conditions as in Example 1.

Moisture content below 8% on leaving the extruder: the end product loses its shape and disintegrates when soaked in a liquid for 5 minutes.

Approximately 12%: crispy product which floats and has a firm texture in the mouth after soaking.

Moisture content above 18% on leaving the extruder: part of the product no longer floats on the surface of the liquid and "sinks" to the bottom of the bowl.

It can be seen that, for certain limiting values, the product obtained is either too hard and too dense and therefore difficult to cut on leaving the extruder and partly "sinks" in the bowl or is too swollen and disintegrates rapidly on contact with a liquid.

Example 3

A mixture comprising 43 kg of ground cereals consisting of a mixture of corn semolina and wheat flour, 4 kg of a mixture of 1 kg of skimmed milk powder and 3 kg of oatmeal and 1 kg of sodium chloride is prepared. The mixture thus prepared is introduced into a twin-screw extruder/cooker together with 10 to 12 kg of an emulsified mixture of hydrogenated palm oil and water. The extrusion/cooking step is carried out at a temperature of 110° to 125° C. under a pressure of 100 to 120 bar and at a rotational speed of the screws of 250 revolutions per minute.

The extrusion-cooking step lasts around 30 to 50 seconds. The extruded/cooked mixture leaves the extruder through an extrusion die with the required shape and is cut just after leaving the die. The product obtained has a moisture content of 10 to 12% and is dried in a fluidized bed for around 15 minutes at 100° to 120° C. to obtain an end product having a moisture content of 3%.

The end product thus obtained has a thickness of 3.5 mm at its thickest point and a specific gravity of 350 g/l.

In a suitable pack, the product thus prepared keeps for several months at ambient temperature. It may be added to a dehydrated soup and thus preserved. The soup is reconstituted by addition of 150 ml of hot water to 20 g of dehydrated soup and leaving for 5 minutes. The product according to the invention floats on the surface of the soup for at least the entire duration of its reconstitution and consumption. After soaking for 5 minutes in the hot soup, the product still has an acceptable texture in the mouth. It does not disintegrate on contact with the liquid or with a spoon and does not have a "gummy" texture.

Example 4

A mixture comprising 40 kg of ground cereals consisting of a mixture of corn semolina and wheat flour, 7 kg of a mixture of skimmed milk powder, sucrose and oatmeal and 1 kg of sodium chloride and also flavouring agents is prepared. The mixture thus prepared is introduced into a twin-screw extruder/cooker together with 7 to 10 kg of an emulsion of hydrogenated palm oil and water. The extrusion-cooking step is carried out at a temperature of 115° to 130° C., under a pressure of 100 to 130 bar and at a rotational speed, of the screws of 250 revolutions per minute. The extrusion-cooking step lasts about 30 to 50 seconds. The extruded/cooked mixture leaves the extruder through an extrusion die with the required shape and is cut immediately after leaving the extrusion die.

The product obtained has a moisture content of 7 to 12% and is dried in a fluidized bed for around 15 minutes at 100° to 120° C. to obtain an end product having a moisture content of 3 to 5%. The end product thus obtained has a thickness of 4.0 mm at its thickest point and a specific gravity of 180 g/l.

The product thus obtained may be added to an already prepared salad. The product according to the invention retains its crispy character.

We claim:

1. A process for preparing a dried food product comprising introducing into a twin-screw extruder ingredients which comprise a ground cereal substance selected from the group consisting of cereal flour and semolina and which comprise a fat, water and a filler substance selected from the group consisting of a protein substance and a glucide substance and extrusion-cooking the ingredients to obtain an extruded, cooked product, cutting the extruded, cooked product to obtain product pieces and then drying the product pieces and wherein the ingredients are introduced in amounts and are extrusion-cooked under a temperature of from 80° C. to 160° C. under a pressure of from 60 bar to 150 bar so that upon the extrusion-cooking, the extruded, cooked product has, by weight, a fat content of from 6% to 14% and a moisture content of from about 10% to 16% and so that upon the extrusion-cooking and drying, the dried product has a specific gravity of from 150 g/l to 500 g/l and wherein the extruded, cooked product is cut so that the dried product has a thickness of from 1.5 mm to 5 mm.

2. A process according to claim 1 wherein the cereal substance is in an amount of from 35 parts to 50 parts by weight and the filler substance is in an amount of from 5 parts to 15 parts by weight.

3. A process according to claim 1 wherein the ingredients are extrusion-cooked at a temperature of from 110° C. to 130° C. and under a pressure of from 100 bar to 130 bar.

4. A process according to claim 1 wherein the ingredients are extrusion-cooked for from 30 seconds to 90 seconds.

5. A process according to claim 1 wherein the extruded, cooked product is dried to a moisture content of from 1% to 3% by weight.

6. A process according to claim 3 wherein the extruded, cooked product is dried to a moisture content of from 1% to 3% by weight.

7. A process according to claim 1 wherein the extruded, cooked product is dried at a temperature of from 80° C. to 130° C.

8. A process according to claim 1 wherein the extruded, cooked product is dried at a temperature of from 100° C. to 130° C.

9. A process according to claim 8 wherein the extruded, cooked product is dried in a fluidized bed drier.

10. A process according to claim 3 wherein the extruded, cooked product is dried in a fluidized bed drier at a temperature of from 100° C. to 130° C.

11. A process according to claim 1 wherein the filler substance is a protein substance selected from the group consisting of animal and vegetable proteins.

12. A process according to claim 1 wherein the filler substance is selected from the group consisting of bran, skimmed milk powder, oatmeal, soya flour, sucrose and glucose.

13. A process according to claim 2 wherein the filler substance comprises from 2.5 to 5.5 parts oatmeal, from 0.5 to 3 parts skimmed milk powder and up to 7 parts of a substance selected from the group consisting of sucrose and glucose.

14. A process according to claim 1 wherein the cereal substance is selected from the group consisting of wheat, corn and barley.

15. A process according to claim 1 wherein the fat is hydrogenated palm oil.

* * * * *